United States Patent [19]

Desai et al.

[11] Patent Number: 4,511,791
[45] Date of Patent: Apr. 16, 1985

[54] ELECTRONIC BALANCE METER

[75] Inventors: Avinash J. Desai, Reynoldsburg, Ohio; Gerhard Kreikebaum, Knoxville, Tenn.

[73] Assignee: Owens-Corning Fiberglas Corporation, Toledo, Ohio

[21] Appl. No.: 488,489

[22] Filed: Apr. 25, 1983

[51] Int. Cl.³ .............................................. H05B 1/02
[52] U.S. Cl. .................... 219/497; 219/483; 219/486; 219/501; 219/508; 65/12; 65/162; 65/164; 364/482
[58] Field of Search ............... 219/494, 490, 497, 483, 219/485, 486, 501, 497, 508–510, 201; 364/577, 482, 483; 65/1, 12, 162, 164

[56] References Cited

U.S. PATENT DOCUMENTS

| | | | |
|---|---|---|---|
| 3,246,124 | 4/1966 | Tretheway | 219/501 |
| 3,820,967 | 6/1974 | Johnson | 65/2 |
| 3,984,768 | 10/1976 | Stuples | 364/482 |
| 4,024,336 | 5/1977 | Jensen | 13/6 |
| 4,130,406 | 12/1978 | Wakasa et al. | 65/2 |
| 4,162,379 | 7/1979 | Sebens et al. | 219/494 |
| 4,333,002 | 6/1982 | Kozak | 219/486 |
| 4,343,637 | 8/1982 | Shofner et al. | 65/2 |
| 4,421,976 | 12/1983 | Jurek | 219/483 |

OTHER PUBLICATIONS

Standard Handbook for Electrical Engineers, Donald G. Fink, Editor in Chief, pp. 2-5.

Primary Examiner—M. H. Paschall
Attorney, Agent, or Firm—Ronald C. Hudgens; Patrick P. Pacella; Ronald E. Champion

[57] ABSTRACT

The bushing temperature measurement device is a microprocessor based sensor which determines the temperature across a multi-segment electrical resistance heated glass fiber producing bushing. The temperature change is determined by calculating the change in resistance of each segment of the bushing by sensing the voltage drop across that segment and dividing by the current flowing in that segment. All measurements of voltage and current are taken simultaneously and averaged over several cycles. The microprocessor, through appropriate output circuitry, alerts other process controls to eliminate any change in temperature.

6 Claims, 12 Drawing Figures

ELECTRONIC BALANCE METER

TECHNICAL FIELD

The bushing temperature measurement device relates to glass fiber production arts and more specifically to an apparatus and method of determining the change in temperature in various segments of a multi-segment glass fiber producing electrical resistance heated bushing.

BACKGROUND ART

As the number of glass fibers produced by a single glass fiber producing bushing has increased, the size of the bushing has increased. It has been necessary to compartmentalize some of these large bushings into segments as disclosed in Grubka, U.S. Pat. No. 4,272,272 which is hereby incorporated by reference. It has been difficult to measure the temperature of these large bushings across the face of the bushing. Tretheway, U.S. Pat. No. 3,246,124, used multiple thermocouples to sense the temperature at various points on the bushing and then averaged these readings to effectuate process control. Johnson, U.S. Pat. No. 3,820,967, removed the thermocouples from the bushing and placed them below the bushing to maintain control. Jensen, U.S. Pat. No. 4,024,336, used two thermocouples to sense the temperature at two points on the bushing to vary the power supplied to each segment of the bushing. Thermocouples on the bushing are prone to premature failure due to the high heat generated by the bushing. There is also a finite time lag between a temperature change on the bushing and a change in the reading produced by a thermocouple. The thermocouple outputs a millivoltage reading while the bushing is carrying thousands of amperes of alternating current which can easily mask the thermocouple signal.

Non-contacting measurements, such as infrared, have also been tried to measure the temperature of the bushings. Wakasa, U.S. Pat. No. 4,130,406, sensed the breakage of fibers with an infrared detector. Shofner, U.S. Pat. No. 4,343,637, used a similar detection system to control the process including supplying power to the bushing. Direct infrared temperature measurement of the bushing has always been imprecise due to the presence of the issuing streams of molten glass and the crowded conditions under the bushing caused by devices such as fin shields as disclosed in Stream, U.S. Pat. No. 4,153,438.

The present application overcomes the problems associated with both thermocouple and infrared temperature measurements by determining the temperature of each segment of the bushing by calculating the resistance of the bushing. A physical relationship, known as the temperature coefficient of resistance, exists between the resistance of a metal and the temperature of the metal. The resistance of a segment of the bushing can be determined by measuring the voltage drop across the segment when a known current is passed through the bushing. By using the temperature coefficient of resistance, a change in resistance of a segment of the bushing can be used to determine a temperature change.

DISCLOSURE OF THE INVENTION

One method of producing glass fibers is to attenuate molten glass through a precious metal bushing to produce fibers. The bushing forms a container with holes spaced therein through which the molten glass is drawn by mechanical means. It is advantageous to heat this bushing to produce a uniform temperature for drawing the molten glass. The metal used to produce the bushing has a known resistance versus temperature relationship. A high electrical current is passed through the metal to electrically heat the bushing. The diameter of the fibers produced is dependent upon the composition of the material, the temperature of the glass, the thermal conditions below the bushing which affects the rate of cooling of the molten glass fiber, and the stress introduced into the fiber by the mechanical attenuation of the fibers.

The object of the attenuation process is to produce a plurality of fibers of uniform diameter. It has been found that maintaining a uniform temperature across the bushing aids in maintaining uniform fiber diameter. It has always been difficult to accurately determine the temperature across the face of a bushing. Optical methods of temperature measurement have been frustrated because of the limited space under the bushing, interference from the issuing streams of molten glass and the hostile environment below the bushing. Standard thermocouple techniques have also been difficult due to the high current alternating current power being fed to the bushing and the high temperatures involved. The method used by the present invention to determine temperature overcomes these limitations.

The bushing acts as a resistor whose resistance changes with temperature. Over a narrow band of temperature within the glass melting range, the value of resistance changes in a linear fashion with temperature. This linear function can be expressed as:

$$R_2 = R_1[1 + \alpha(T_2 - T_1)]$$

where $R_2$ is the resistance of the bushing at temperature $T_2$ and $R_1$ is the resistance of the bushing at temperature $T_1$. The term $\alpha$ is the temperature coefficient of resistance. This phenomenon is well known and values of $\alpha$ are given in various reference books for various metals and temperature ranges.

In order to determine the resistance of the bushing, wires are welded to various points on the bushing. The voltage drop across various segments of the bushing can then be measured. The total voltage drop across the bushing can also be measured. The sensor wires are welded to the bushing in the present invention in such a manner that the bushing is divided into a group of series resistors. The current flowing in each segment of the bushing is, therefore, the same by the nature of the series configuration. As the temperature of a given segment of the bushing changes, the resistance of that segment changes. The current flow being constant causes the voltage drop across that segment to change. Similarly, since one segment of this series string of resistors has changed, the total resistance of the bushing has changed and the voltage drop across the total bushing has changed.

The power to the bushing is supplied by a step-down power transformer which reduces the voltage and greatly increases the current. The voltage output of the secondary of this power transformer is in the neighborhood of 1–10 volts while the current is in the thousands of amperes. This necessitates inferring the current flow in the secondary of the transformer by measuring the current flow in the primary of the transformer. The power is alternating current which requires reading the current flow and all voltages at precisely the same time to prevent inaccuracies due to measuring the signal at various points on the sine wave. The resistance of each segment of the bushing can be determined by Ohm's law relationship wherein the resistance is the voltage drop across the segment divided by the current flowing through that segment. In the present invention, a microprocessor is used to calculate the resistance value and convert this value into temperature. This value is stored in random access memory and then is compared to the temperature derived at a later point in time. If a temperature change occurs in only one segment outside of predetermined limits, warning indicator lights are lit. Simultaneously, the microprocessor informs the main plant computer so that adjustments can be made in the process, such as repositioning fin shields, increasing or decreasing cooling water or air flow or injecting additional power to only the affected segment of the bushing. If all segments exhibit a similar rise in temperature or a similar lowering of temperature, the microprocessor can immediately send a signal to the power transformer controller and adjust the set point control of the power supplied by the bushing transformer upward or downward to maintain a uniform temperature on the bushing.

The present invention can, therefore, determine the voltage drop across each segment of the bushing, derive the current flowing in the bushing, determine the resistance of each segment of the bushing, determine the absolute temperature of each segment of the bushing and signal various process control devices to maintain a contant temperature.

BEST MODE FOR CARRYING OUT THE INVENTION

Figure 1:
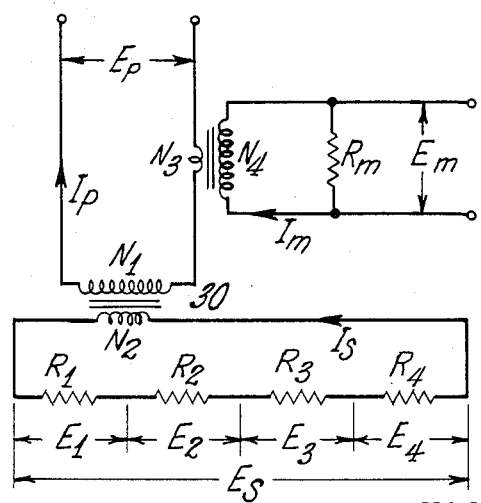
FIG. 1 is the electrical circuit defining the source of the input signals for the bushing temperature measurement device.

FIG. 1 gives a description of the signals used by the present invention. The current flowing in the primary of a power transformer $I_p$ is regulated by a control circuit (not shown). The primary of the power transformer has $N_1$ turns while the secondary has $N_2$ turns. The current flowing in the secondary of the power transformer $I_s$ is, therefore, $I_s=(N_1I_p)/N_2$.

The total resistance of the bushing $R_T$ is equal to the sum of the resistance of the various segments since the resistance is in series $$R_T = \sum_{i=1}^{n} R_i.$$

The resistance is therefore: $R_T=R_1+R_2+R_3+ \ldots +R_n$. The voltage drop across the bushing $E_s$ is equal to the current flowing in the bushing times the resistance of the bushing $E_s=I_sR_T$. Substituting gives the relationship: $E_s=I_s[R_1+R_2+R_3+ \ldots +R_n]$ $$E_s=I_sR_1+I_sR_2+I_sR_3+ \ldots +I_sR_n$$

$$E_s=E_1+E_2+E_3+ \ldots E_n$$

The current $I_s$ is so high that direct measurement with a high degree of precision is impractical. The primary current $I_p$ can be practically measured using a commercially available current transformer. This current transformer has a primary winding $N_3$ in series with the primary circuit of the power transformer. A secondary winding $N_4$ induces a measurement current $I_m$ in the secondary of the current transformer. This current $I_m$ is dropped across a precision resistor $R_m$ to produce a measurement voltage $E_m$. This measurement voltage is therefore: $E_m=I_mR_m$. The primary current is $I_p=(-N_4I_m)/N_3$.

The secondary current is $I_s=(N_1I_p)/N_2$. Substituting gives:

$$I_s = \frac{N_1 N_4}{N_2 N_3} I_m.$$

Since the bushing is a series connection of resistors and the relationship $E_i=I_sR_i$ is true for any segment i, or $I_s=E_i/R_i$ then we can express the relationship as:

$$\frac{E_i}{R_i} = \frac{N_1 N_4 E_m}{N_2 N_3 R_m}$$

The resistor $R_m$ is a fixed precision resistor, and the value of the windings $N_1$, $N_2$, $N_3$ and $N_4$ are constants. This expression can be rewritten as: $R_1=(K\ E_i)/E_m$ where $$K = \frac{R_m N_2 N_3}{N_1 N_4}$$

Therefore, instantaneously at time $t_o$ the i segment of the bushing has a resistance of: $R_i=(K\ E_i)/E_m$. At some different time $t_1$ the resistance would be: $R_i'=(K\ E_i')/E_m'$ We know, however, that there is a relationship between temperature and resistance as expressed by:

$$R_2 = R_1[1 + \alpha(T_2 - T_1)]$$

substituting in our two resistances wherein $R_2 = R'_i$ and $R_1 = R_i$ we get:

$$\frac{K E'_i}{E_m'} = \frac{K E_i}{E_m}[1 + \alpha(T_2 - T_1)]$$

and re-arraying terms yields:

$$\Delta T = T_2 - T_1 = \frac{1}{\alpha}\left[\frac{\frac{E'_i}{E_m'}}{\frac{E_i}{E_m}} - 1\right]$$

The above derivation shows how, by measuring the voltage drops across various segments of a bushing, the temperature change of that segment of the bushing can be determined.

Figure 2:
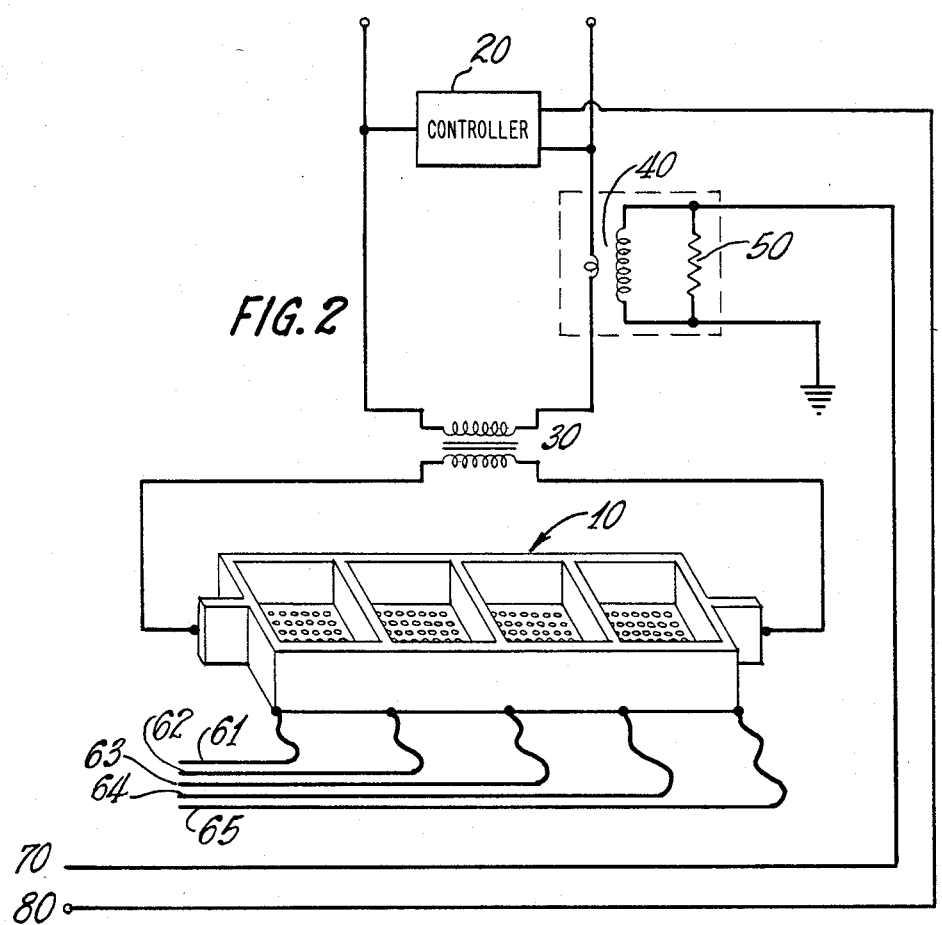
FIG. 2 is an illustration showing the electrical connections to a glass fiber producing bushing.

FIG. 2 is a representation of the various electrical connections necessary to practice the present invention. FIG. 2 represents a four segment bushing although the present invention is not limited to only four segments but can be practiced by dividing the bushing into any number of segments. FIG. 2 shows bushing 10 divided into four segments with five signal lines designated 61, 62, 63, 64 and 65. The voltage differential between signal lines 61 and 62 gives the voltage drop across the first segment of bushing 10. The voltage differential between signal lines 62 and 63 gives the voltage drop across the second segment of bushing 10. The voltage differential between signal lines 63 and 64 gives the voltage drop across the third segment of bushing 10. The voltage differential between signal lines 64 and 65 gives the voltage drop across the fourth segment of bushing 10. Item 40 is a current measurement transformer with a primary winding $N_3$ and a secondary winding $N_4$ which gives a measurement current $I_m$ proportional to the primary current $I_p$ in the ratio $I_m = (N_3/N_4)I_p$. The precision resistor $R_m$ is item 50 and has a typical value of 0.5 ohms. Voltage signal $E_m$ is therefore the current flow $I_m$ through precision resistor $R_m$ and is impressed on signal line 70. The power transformer 30 has primary winding $N_1$ and secondary winding $N_2$. The controller for the set point of power transformer 30 is item 20 which has an external control line represented by signal line 80.

Figure 3:
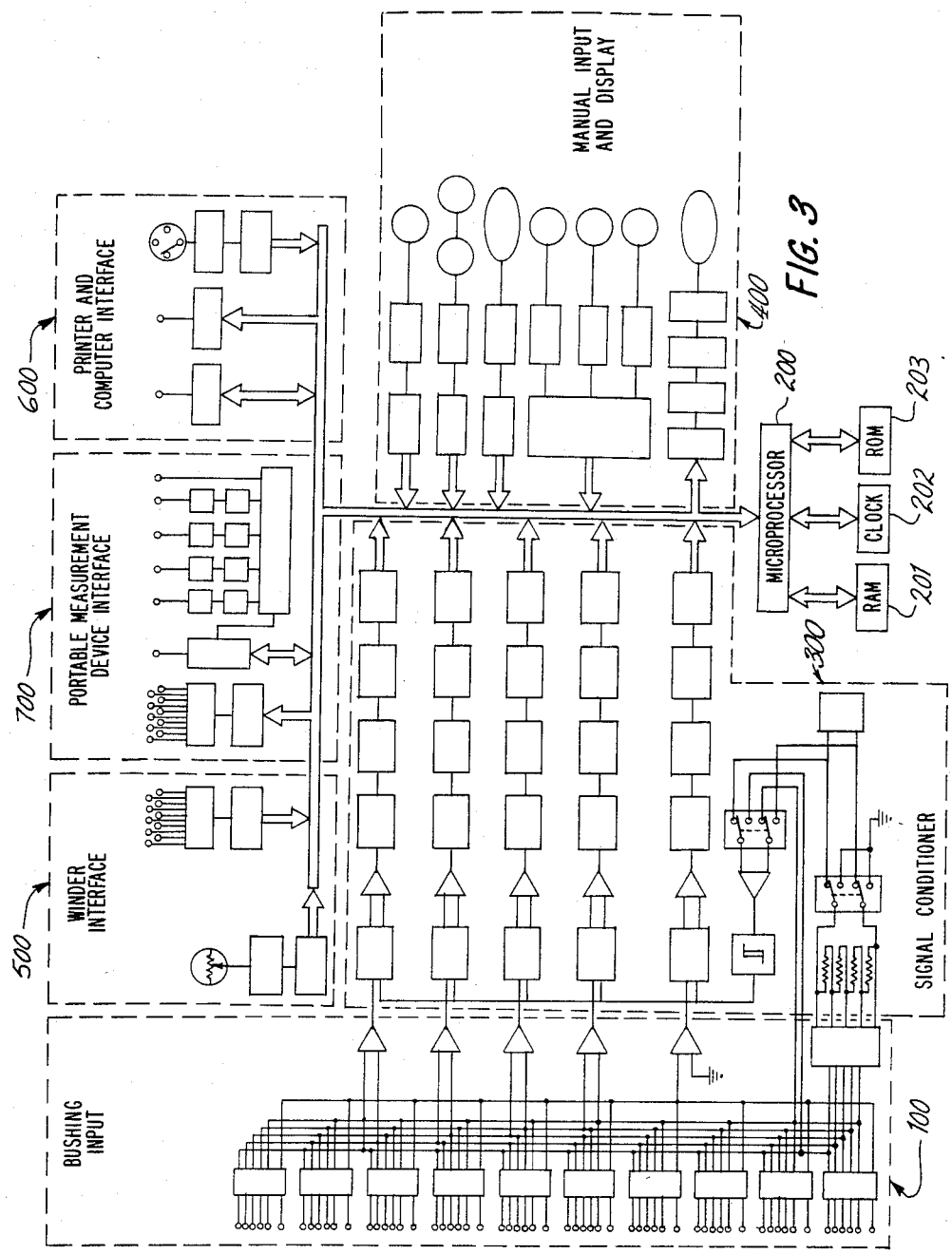
FIG. 3 is an electrical circuit diagram of the bushing temperature measurement device.
Figure 4:
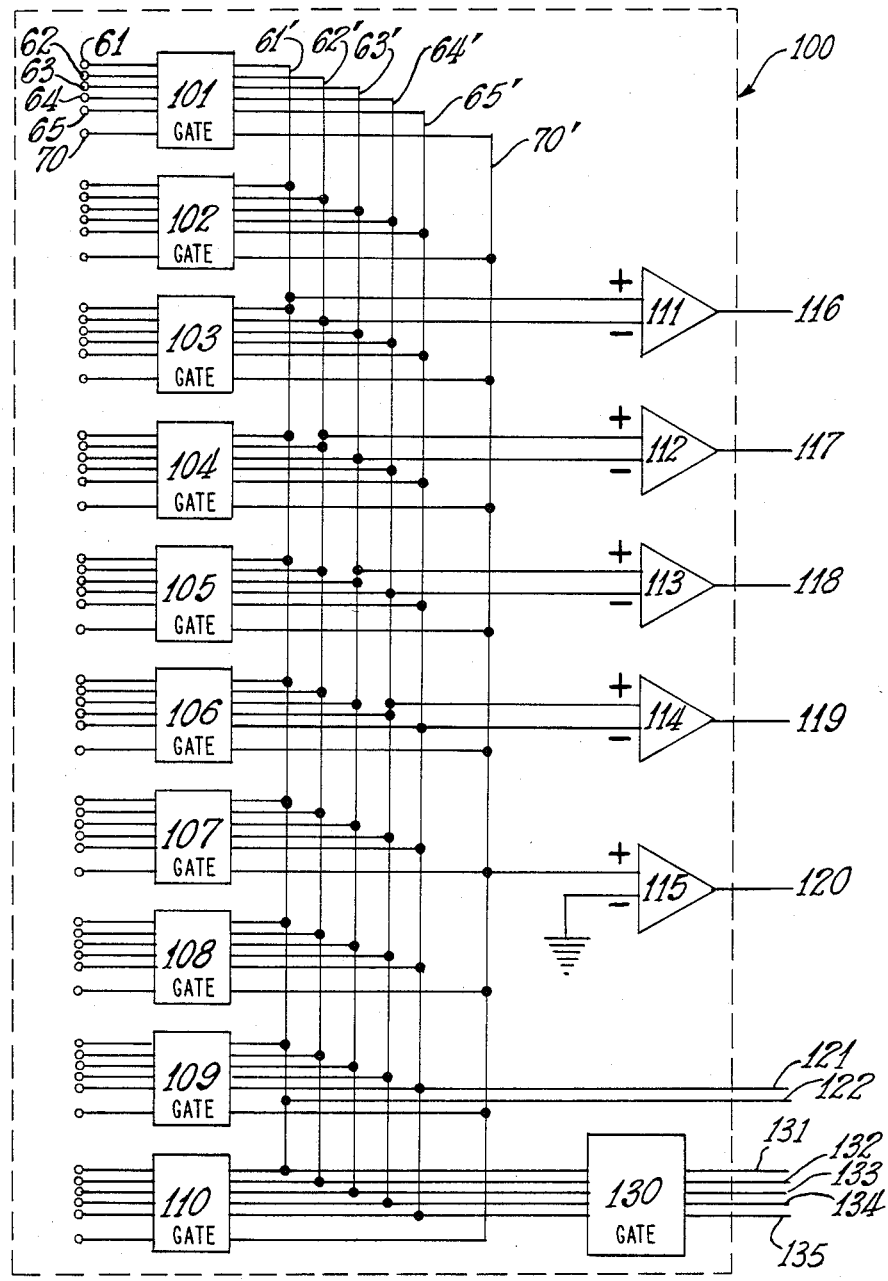
FIG. 4 is an electrical diagram of the input circuitry of the bushing temperature measurement device.

FIG. 3 is a schematic in block diagram form of the bushing temperature measurement device. The bushing temperature measurement device is a microprocessor controlled unit which can be explained by breaking it into its component sections and explaining the function of each section separately. Item 100 is the input portion of the bushing temperature measurement device and is described in detail in FIG. 4. The unit, as shown in FIG. 3 and expanded as input functions in FIG. 4, can measure up to ten (10) bushings. Each bushing is equivalent to the bushing 10 shown in FIG. 2. The number of bushings which may be connected to the bushing temperature measurement device is not limited to 10 as any number of bushings may be connected to the bushing temperature measurement device. Since ten (10) bushings are shown, ten (10) gates 101–110 are provided, one for each bushing. Each gate has six data inputs. Lines 61–65 are the voltage taps from each segment of each bushing, and line 70 is the voltage tap for the voltage $E_m$ from the primary circuit of the power transformer 30 for that particular bushing. The outputs of all of the gates are wired together as shown in FIG. 4. The gates are under control of microprocessor 200 through control lines and address lines (not shown) as is known in the art. These control and address lines from microprocessor 200 only activate or enable one gate at a time. All other gates are non-conductive, and the output lines from the non-activated gates look like open circuits. As an example, when gate 101 is activated by microprocessor 200, then the signal on input line 61 becomes impressed on output signal line 61'; the signal on input signal line 62 is impressed on output signal line 62'; the signal on input signal line 63 is impressed on output signal line 63'; the signal on input signal line 64 is impressed on output signal line 64'; the signal on input signal line 65 is impressed on output signal line 65'; and the signal on input line 70 is impressed on output signal line 70'. All other gates 102–110 are inactive, and the input signals being fed to them are not being transmitted to their output lines. The only signals on output lines 61'–65' and 70' are these from the input of gate 101.

A differential amplifier 111 has its positive input connected to signal line 61' and its negative input connected to signal line 62'. The output on line 116 is, therefore, the difference in voltage between lines 61' and 62' which is the same as the difference between the signals on signal lines 61 and 62. This differential signal, referring back to FIG. 2, is the voltage drop across the first segment of bushing 10 or, as shown in FIG. 1, is equal to the voltage $E_1$. Therefore, voltage $E_1$ is on signal line 116 which is the output of differential amplifier 111.

Similarly, differential amplifier 112 has its positive input connected to signal line 62' and its negative input connected to signal line 63'. The output of differential amplifier 112 impressed on signal line 117 is voltage $E_2$ which is the voltage drop across the second segment of bushing 10. Differential amplifier 113 compares the signals on signal line 63' and 64' to give voltage $E_3$ on output line 118. Differential amplifier 114 compares signal lines 64' and 65' to give $E_4$ on line 119. Differential amplifier 115 has the signal on signal line 70' impressed upon its positive input. The negative input to differential amplifier 115 is connected to ground. Referring to FIGS. 1 and 2, it can be seen that signal line 70' is the same signal as signal line 70. This is the voltage $E_m$ dropped across precision resistor 50 in FIG. 2. The output of differential amplifier 115 on signal line 120 is, therefore, $E_m$.

Line 121 is connected to signal line 65', and line 122 is connected to signal line 61'. The difference between these two signals is the voltage drop across the total bushing 10 which was designated $E_s$ in FIG. 1. The use of signal lines 121 and 122 will be explained below.

A programmable gate 130 is provided which has lines 131 through 135 as input lines. The microprocessor 200 can program gate 130 by means of control lines (not shown) such that lines 131 through 135 will be outputted on signal lines 61' through 65'. The use and function of these signals will also be explained below.

Figure 5:
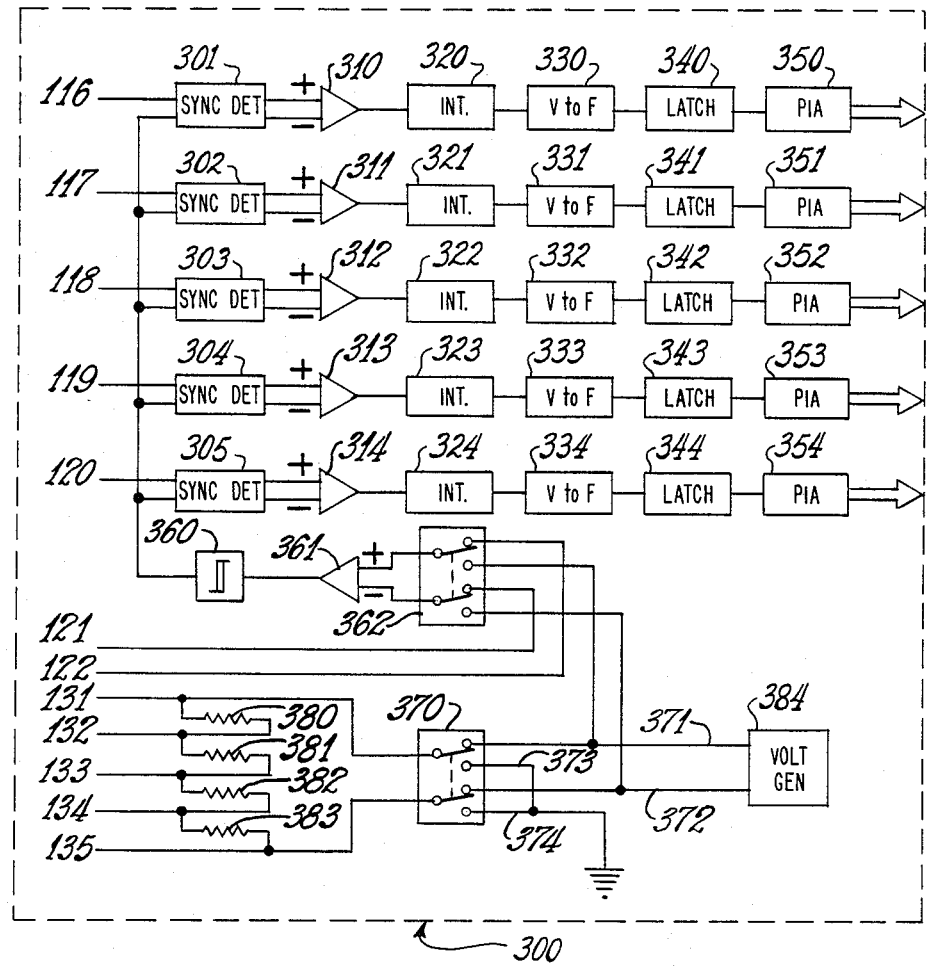
FIG. 5 is an electrical diagram of the input data conditioning circuit of the bushing temperature measurement device.

Item 300 of FIG. 3 is expanded as FIG. 5. Referring to FIG. 5, signal line 121 has the signal from signal line 65' impressed upon it, which is the voltage at the end of the last segment of bushing 10; and signal line 122 has the signal from signal line 61' which is the signal from the beginning of the first segment of bushing 10 impressed upon it. Signal lines 121 and 122 are fed to relay 362. In the normal position of relay 362, signal line 121 is placed on the negative input of differential amplifier 361 while signal line 122 is placed on the positive input of differential amplifier 361. Relay 362 is under control of microprocessor 200 through control lines (not shown). The output of differential amplifier 361, when relay 362 is in its normal position, is the total voltage drop across bushing 10 which is designated as $E_s$ in FIG. 1. This output $E_s$, which is a sine wave, feeds square wave generator 360. The output of square wave generator 360 is a square wave with constant amplitude and with frequency and phase of the input wave $E_s$. The output of square wave generator 360 is fed to the carrier input of the synchronous detectors 301–305. The signal inputs to the synchronous detectors 301–305 are the individual signals 116–120 from the differential amplifiers 111–115 of FIG. 4. As way of example, synchronous detector 301 receives the square wave signal from square wave generator 360 and the input signal on signal line 116 is a sinesoidal signal. The synchronous detector 301, in combination with the differential amplifier 310, switches the polarity of the input signal 116 in synchronism with the square wave signal from square wave generator 360. The output of the amplifier 310 is therefore a rectified signal of the voltage drop across the first segment of bushing 10.

In order to produce a signal which is of proper magnitude for further manipulation, a series of integrators 320–324 are used. Integrator 320 integrates the input signal over time, controlled by microprocessor 200 and its associated clock 202 of FIG. 3. The outputs of the integrators 320–324 are converted to a frequency signal by voltage to frequency convertors 330–334. Voltage to frequency convertor 330 converts the voltage output by integrator 320 into a frequency signal proportional to the input voltage. The output of voltage to frequency convertor 330 is fed to latch 340 which stores the signal for parallel interface adapter 360. The parallel interface adapter 350 converts the frequency signal into a proper binary format which can be accepted by the data bus of microprocessor 200. The microprocessor 200 signals the parallel interface adapter 350, by means of control and address lines (not shown), when to impress its binary signal on the data bus. Once the microprocessor 200 bus accepted the signal, it then clears the contents of the parallel interface adapter 350 and resets both the latch 340 and the synchronous detector 301.

The circuit, therefore, composed of elements 301, 310, 320, 330, 340 and 350, receives an input on line 116 proportional to the voltage drop $E_1$, across the first segment of bushing 10 and outputs a digital signal onto the data bus of microprocessor 200 which is properly conditioned for acceptance by microprocessor 200 and is proportional to the input signal. The circuit, composed of elements 302, 311, 321, 331, 341 and 351, accepts an input from signal line 117 which is the voltage drop $E_2$ across the second segment of bushing 10 and outputs a digital signal proportional to the input signal. Similarly, the circuit, composed of elements 303, 312, 322, 332, 342 and 352, converts the signal on line 118 which is the voltage drop $E_3$ across the third segment of bushing 10 and the circuit composed of elements 304, 313, 323, 333, 343 and 353, converts the signal on line 119 which is the voltage drop $E_4$ across the fourth segment of bushing 10. Signal line 120 carries $E_m$, which is the measurement voltage of the primary of the power transformer, and circuit elements 305, 314, 324, 334, 344 and 354 condition the signal into a digital format acceptable to microprocessor 200.

Referring back to relay 362 of FIG. 5, it can be seen that the normal position connects signal lines 121 and 122 to differential amplifier 361. Relay 362 is under control of microprocessor 200 and can be switched such that signal line 371 is fed to the positive side of differential amplifier 361, and, simultaneously, signal line 372 is fed to the negative side of differential amplifier 361. Signal lines 371 and 372 originate at calibration voltage generator 384. In the normal position of relay 370, signal line 371 is connected to signal line 131, and signal line 372 is connected to signal line 135. The alternate position of relay 370 causes both signal line 131 and 135 to be grounded through lines 373 and 374.

Referring back to FIG. 4, gate 130 is a programmable gate which can be programmed by microprocessor 200 through address and control lines (not shown). Gates 101 to 110 are inactive when gate 130 is closed. The purpose of gate 130 is to provide zero and calibration signals through relay 370. Fixed calibration resistors are provided in the calibration circuit. The voltage across resistor 380 is similar to the voltage across segment 1 of bushing 10. The voltage across resistor 381 is similar to the voltage across the second segment of bushing 10. The voltage across resistor 382 is similar to the voltage across the third segment of bushing 10. The voltage across resistor 383 is similar to the voltage across the fourth segment of bushing 10.

The calibration procedure is under control of microprocessor 200. During calibration, the programmable gate 130 connects signal lines 131 through 135 with signal lines 61' through 65'. Relay 370 first connects signal lines 371 and 372 from the calibration signal generator to signal lines 131 through 135 and the resistor network 380 through 383.

Simultaneously, the signal lines 121 and 122 are connected by relay 362 to differential amplifier 351 and square wave generator 360. The calibration procedure continues by energizing relays 370 and 362 simultaneously. This connects signal lines 373 and 374 to signal lines 131 and 135 and the resistor network 380 through 383. It also connects signal lines 371 and 372 from the calibration voltage source 384 to the differential amplifier 361 and square wave generator 360. All calibration signals are fed to differential amplifiers 111 through 115 and the remainder of the circuit through parallel interface adapters 350 through 354 onto the data bus to microprocessor 200.

Microprocessor 200 stores this information in random access memory 201. Microprocessor 200 uses the readings for zero calibration and span calibration to correct the voltage readings from the ten bushings.

If the resultant data indicates that the resistance for all segments of the bushing 10 is low, the microprocessor 200 then sends a signal through signal line 80 of FIG. 2 to the controller 20 of the power transformer 30 to reduce the power being supplied to the bushing 10. Conversely, if the resistance of all segments of the bushing is high, then the microprocessor 200 can command the bushing controller 20 to increase the power to bushing 10. If only one segment or less than all segments of the bushing exhibit abnormal conditions, the microprocessor can then relay this information to the main plant computer as will be seen below. The main plant computer can then call for readjustment of fin shields, air flow or cooling water to the affected area. The microprocessor 200 can also point out error signals on a printer or light an indicator lamp as will be seen below.

The operating system and programs which control the actions of microprocessor 200 are stored on nonvolatile read only memory 203. An interface is required to manually connect the microprocessor and its operating system to the real world where the operator may conveniently change set points and parameters. This interface is shown as item 400 of FIG. 3. Item 400 of FIG. 3 is expanded as FIG. 6.

Figure 6:
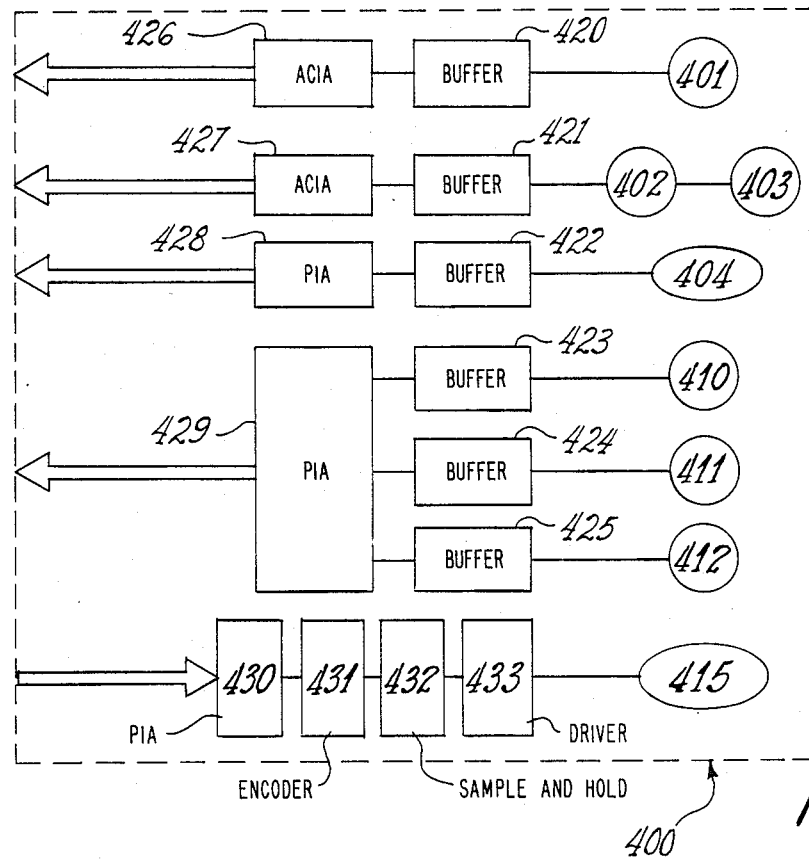
FIG. 6 is an electrical circuit diagram for the input-/output available from the face of the bushing temperature device.
Figure 7:
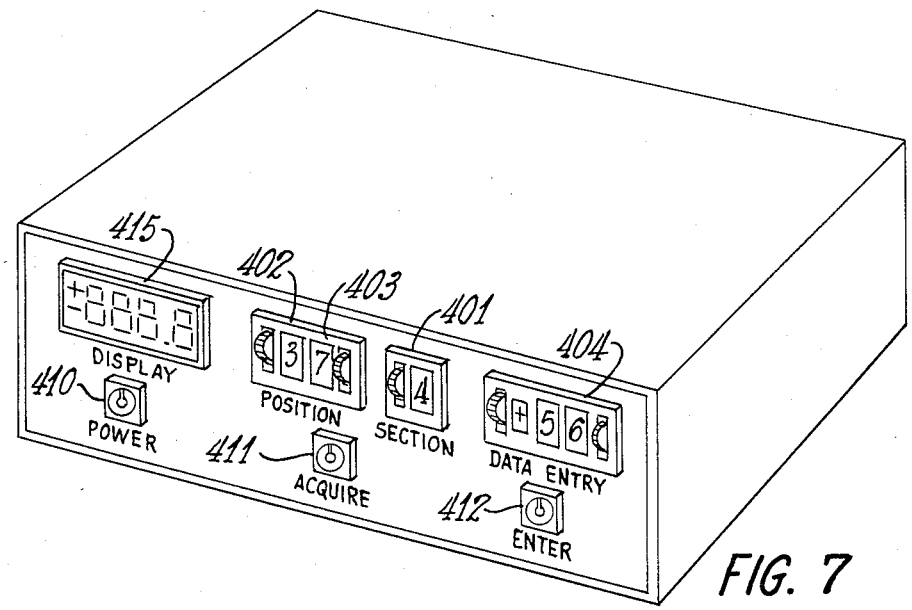
FIG. 7 is an illustration of the face of the bushing temperature measurement device.

FIG. 6 shows the block diagram of the circuitry which allows the operator to interface with the microprocessor. The first item is key switch 410 which in FIG. 7 is shown as the power switch. This switch controls the power to the bushing temperature measurement device. When switch 410 is in the "on" position, power is supplied to the microprocessor. A signal is sent from key switch 410 through buffer 423 where it is conditioned and isolated and relayed to parallel interface adapter 429. Parallel interface adapter 429 impresses the signal onto the data lines when requested by microprocessor 200. Turning key switch 410 off, then on, acts as a master reset for microprocessor 200.

The other two key switches 411 and 412 are used for calibration and data entry. Both of these switches are key activated momentary contact switches. A two position binary coded decimal thumb wheel switch designated as 403 as the lower digit and 402 as the upper digit is used to select the particular bushing under consideration. In our present example, these two switches, in combination, can be set from 01 to 10. Another thumb wheel binary coded decimal switch 401 is provided to select the segment of the bushing under consideration. The number selected by binary coded switch 401 is fed to buffer 420 which isolates and conditions the signal which is fed to asynchronous communication interface adapter (ACIA) 426. ACIA 426 is under control of microprocessor 200 with an address bus and control lines (not shown). Similarly, the combination of binary coded decimal switches 402 and 403 are connected to buffer 421 which isolates and conditions this signal for asynchronous communication interface adapter (ACIA) 427. ACIA 427 is also under control of microprocessor 200 with address bus and control lines (not shown). A four segment, with sign, display 415 is provided to display the differential temperature reading in Fahrenheit degrees for the particular segment, selected by switch 401, for a particular bushing selected by switches 402 and 403. This information reaches display 415 by being read off the data bus by parallel interface adapter (PIA) 430. This information is then processed by encoder 431 and sent to sample and hold circuit 432. The information is then fed to driver circuit 433 which activates display 415.

When key activated switch 411, labeled "acquire" in FIG. 7, is activated, the microprocessor zeroes the display 415 and sets the value previously displayed on 415 as the base temperature of the segment of the bushing selected on switches 401, 402 and 403. The temperature thus selected becomes the base or zero temperature for that segment. If a different temperature needs to be set, then switch 404 is set to that temperature. When key switch 412, labeled "enter" on FIG. 7, is activated, the value stored in switch 404 is fed through buffer 422 to parallel interface adapter (PIA) 428 to the data lines of microprocessor 200. Key switch 412 is wired into the interrupt control of microprocessor 200 such that the information set on switch 404 becomes the new set point of the section of the bushing selected by switches 401, 402 and 403.

Figure 8:
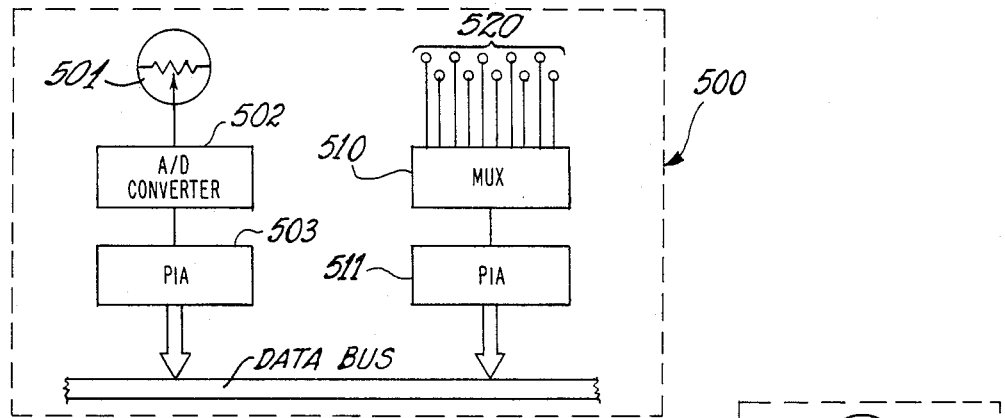
FIG. 8 is an electrical diagram of inputs to the bushing temperature measurement device from other processes in the system.

In order to properly process the algorithms previously mentioned, the microprocessor 200 also needs inputs from other processes in the system. Item 500 of FIG. 3 shows two of these inputs. Item 500 is expanded as FIG. 8. The algorithm relies upon a value $\alpha$ which is the temperature coefficient of resistance of the metal in the bushing. The value of $\alpha$ can be inputted to microprocessor 200 by the main plant computer by software means through a computer interface as will be explained later, or it may be manually set by means of a manually settable potentiometer 501. Potentiometer 501 produces an analog voltage signal which is proportional to the value of $\alpha$. This analog signal is converted into a digital signal by analog to digital convertor 502. The digital signal is then processed by parallel interface adapter 503 which readies the signal for transmission over the data lines when requested by microprocessor 200.

One of the factors which affects the temperature of the bushing is the mechanical attenuation of the fibers issuing from the bushing. A constant pull must be induced on these fibers by a winder. The temperature measurements deduced by the present invention can only be valid if the winder is operating. A signal is fed from each winder when it is operating to a connector 520 of FIG. 8. There is one such connector 520 for each winder. The winder signals are then fed to multiplexer 510 and then to parallel interface adapter 511. The microprocessor 200 can then verify that the winder affecting a particular bushing in operating before the microprocessor 200 performs its temperature computations.

Figure 9:
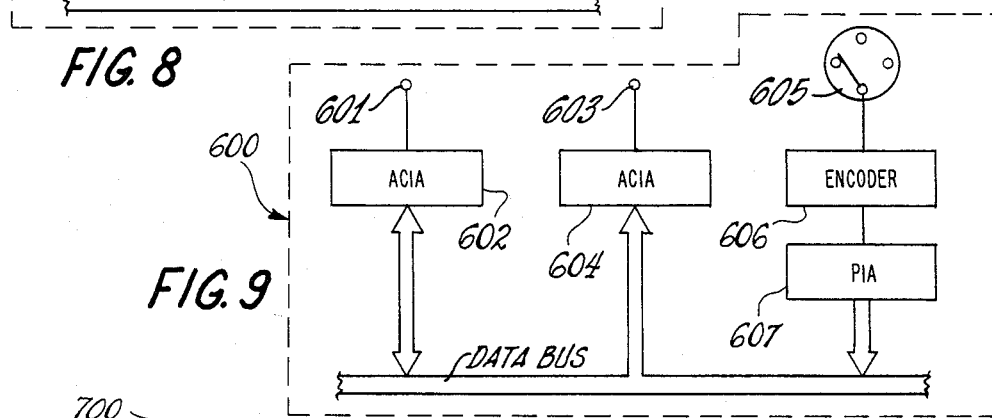
FIG. 9 is an electrical diagram showing the input-/output from the bushing temperature measurement device to a main frame computer and output from the electronic balance meter to a printer.

The bushing temperature measurement device must also communicate to the outside world in an intelligible manner. Item 600 of FIG. 3 shows a method for communication. Item 600 is expanded as FIG. 9. An asynchronous communication interface adapter (ACIA) 602 interconnects the data bus of microprocessor 200 to a communication link 601 to a main frame computer. The bushing temperature measurement device can also print the change in temperature of each segment of each bushing. This information is fed to the printer from signal line 603 which receives its information from asyrchronous communication interface adapter (ACIA) 604. The frequency at which this information is printed is controlled by manually settable switch 605. The switch may be set at, for instance, two minutes, five minutes or off. This would cause the printer to print the information every two minutes or wait and print the information every five minutes. The signal from switch 605 is fed to encoder 606 and then to parallel interface adapter 607 where it is made available to the microprocessor 200 data base.

Figure 10:
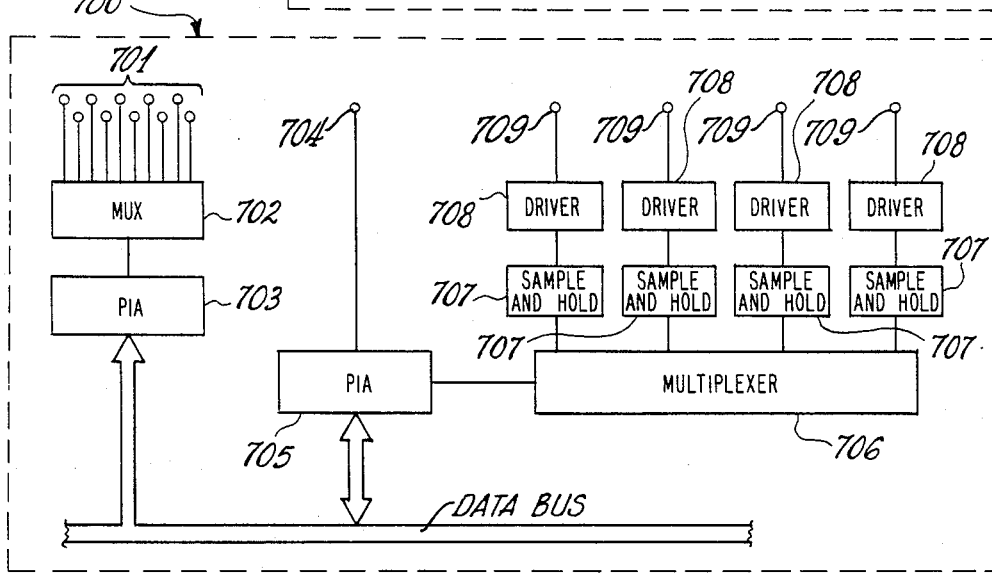
FIG. 10 is an electrical diagram of the outputs of the bushing temperature measurement device to indicator lamps and a portable bushing temperature measurement device.
Figure 11:
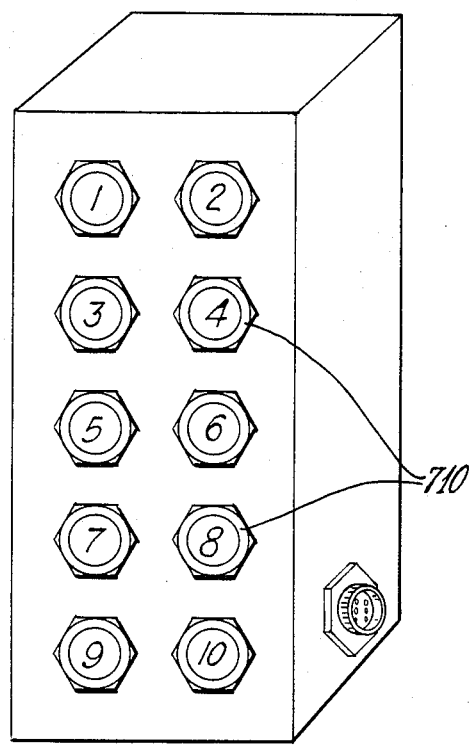
FIG. 11 is an illustration of the indicator lamp panel.
Figure 12:
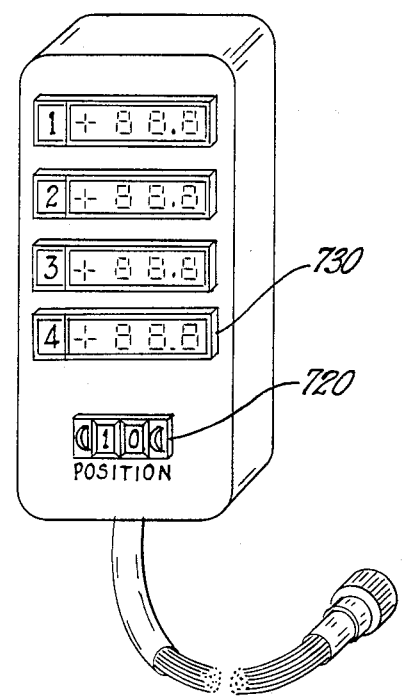
FIG. 12 is an illustration of the portable balance meter.

The microprocessor based bushing temperature measurement device also provides warning signals and temperature data to operating personnel. Item 700 of FIG. 3 shows by way of example some of the indicators and signals available. Item 700 has been expanded as FIG. 10. When the change in temperature of any segment of any bushing exceeds a predetermined amount, the microprocessor 200 activates parallel interface adapter 703 with a bushing signal. Multiplexer 702 then activates the appropriate control line through connector 701 to illuminate a warning lamp item 710 of FIG. 11. Warning lamps 710 are in an enclosure remote from the bushing temperature measurement device in an area below the fiber forming bushings 10. There is one warning lamp 710 for each bushing in the process. In the present example, ten bushings are present, and, therefore, there would be ten warning lamps 710. The operator may then use a portable meter as shown in FIG. 12 to determine which segment of which bushing is out of specification. The operator sets the bushing number in question by means of thumb wheel binary switch 720. The signal produced by this switch goes through signal line 704 of FIG. 10 to parallel interface adapter 705. A request for data is transmitted to microprocessor 200 over the data base. The microprocessor 200 then supplies data back to parallel interface adapter 705 which then transmits this data to multiplexer 706. The temperature data for each segment of the bushing selected by switch 720 is discriminated by multiplexer 706 and impressed on sample and hold circuits 707. Sample and hold circuits 707 then feed the data to light emitting diode driver circuits 708. The signal is fed over line 709 to visual displays 730 in the portable bushing temperature measurement device of FIG. 12. Each segment of the bushing has a separate display 730. Display 730 gives the temperature change in degrees Fahrenheit of each segment of the bushing 10 selected by switch 720. The operator, in response to the error signals indicated by lamps 710 and by the temperature readings on the portable bushing temperature measurement device of FIG. 12, can make manual adjustment to eliminte all temperature variations in the bushing.

INDUSTRIAL APPLICABILITY

The bushing temperature measurement device allows automated temperature measurement of multi-segment electrical resistance heated glass fiber producing bushings. The device senses a change in voltage drop across each segment of the bushing and current flowing in the bushing. This information is converted by the device into signals which can be manipulated by a microprocessor. The microprocessor determines the instantaneous resistance of each segment of the bushing and converts this information into temperature change. The microprocessor then signals other controls to eliminate this change in temperature. The reaction time, accuracy and precision is much greater than relying upon manual detection and response. The glass fiber thus produced is more uniform in diameter than is possible by manual control means.

We claim:

1. An apparatus for measuring the temperature is segments of an electrical resistance heated glass fiber producing bushing and for displaying the change in temperature of each segment of the bushing comprising:
    (a) a glass fiber producing bushing, compartmentalized into individual segments, electrically heated by passing an electrical current through the bushing;
    (b) means to supply an electrical current to flow in the bushing;
    (c) means for determining the electrical current flowing in a glass fiber producing bushing;
    (d) means for simultaneously determining a voltage drop across each segment of the glass fiber producing bushing;
    (e) means to calculate a resistance and a temperature from the resistance for each segment of the glass fiber producing bushing;
    (f) means for storing the temperature of each segment of the glass fiber producing bushing;
    (g) means for determining a change in temperature by use of the stored temperature for each segment of the glass fiber producing bushing;
    (h) means for indicating that the change in temperature of any of the segments of the glass fiber producing bushing is outside a predetermined range; and
    (i) means to display the change in temperature of each segment of the glass fiber producing bushing.

2. An apparatus for measuring the temperature in segments of an electrical resistance heated glass fiber producing bushing comprising:
    (a) a glass fiber producing bushing, compartmentalized into individual segments, electrically heated by passing an electrical current through the bushing;
    (b) a means to produce a signal proportional to an electric current flowing in the glass fiber producing bushing;
    (c) a means to simultaneously sense a voltage drop across each segment of a multiple segment glass fiber producing bushing;
    (d) a means to simultaneously read the signal from (a) and the voltages from (b) above, to digitize the signal and the voltages and to determine by means of a microprocessor the change in temperature of each segment of the glass fiber producing bushing;
    (e) means to determine if the change in temperature of each segment of the glass fiber producing bushing is within a predetermined range;
    (f) means to communicate the change in temperature to external devices including a computer; and
    (g) means to indicate that the temperature change is outside a predetermined range.

3. An apparatus for measuring the temperature in segments of a glass fiber producing bushing comprising:
    (a) a glass fiber producing bushing, compartmentalized into individual segments, electrically heated by passing an electrical current through the bushing;
    (b) a means for sensing an electrical current flow in the primary winding of a glass fiber producing bushing power transformer;
    (c) a means to connect the current sensed in the primary winding of a glass fiber producing bushing power transformer to a voltage proportional to the current sensed;
    (d) a means for simultaneously sensing a voltage dropped across each segment of a glass fiber producing bushing;
    (e) a means for simultaneously reading and digitizing the voltage signals of (c) and (d) above;
    (f) microprocessor means for calculating a change in temperature of each segment of the glass fiber producing bushing on the basis of the formula:

$$\Delta T_i = T_2 - T_1 = \frac{1}{\alpha}\left[\frac{\frac{E_i^1}{E_m^1}}{\frac{E_i}{E_m}} - 1\right]$$

wherein:
$\Delta T_i$ = change in temperature of segment i from a set point temperature;
$\alpha$ = resistivity change per degree Fahrenheit for the metal used in the bushing;

$E_i$ = voltage drop across segment i at time of measurement;

$E_m$ = voltage drop across primary circuit at time of measurement;

$E_i^1$ = voltage drop across segment i at time of calibration of set point temperature;

$E_m^1$ = voltage drop across primary circuit at time of calibration at set point temperature;

(g) means for producing an output signal proportional to the value of $\Delta T_i$; and (h) means for indicating if the output signal $\Delta T_i$ is outside a predetermined range of values.

4. An apparatus for measuring the temperature across the face of an electrical resistance heated glass fiber producing bushing comprising;

(a) a glass fiber producing bushing, compartmentalized into individual segments, electrically heated by passing an electrical current through the bushing;

(b) means for simultaneously measuring the voltage drop across each segment of the bushing;

(c) means for measuring a current flowing in the bushing;

(d) means for calculating a resistance for each segment of the bushing from the current and voltage drop measured;

(e) means for calculating a temperature from the resistance calculated for each segment of the bushing; and (f) means to store the value of the temperature calculated.

5. A method for measuring the temperature in an electrical resistance heated glass fiber producing bushing comprising the steps of:

(a) compartmentalizing a glass fiber producing bushing into undeveloped segments;

(b) flowing an electric current through the bushing to electrically resistance heat the bushing;

(c) determining the current flowing in the bushing;

(d) simultaneously sensing a voltage drop across each segment of the bushing;

(e) deriving a resistance of each segment of the bushing by dividing the current flow in the bushing into the voltage drop across each segment of the bushing;

(f) converting the resistance of each segment of the bushing into a temperature for each segment;

(g) storing the temperature for each segment of the bushing;

(h) repeating steps (c) through (f) above to determine a new temperature for each segment of the bushing;

(i) determining the difference between the stored temperature and the new temperature for each segment of the bushing; and (j) indicating when the difference in temperature is outside a predetermined range.

6. A method for measuring the temperature in segments of electrical resistance heated glass fiber producing bushing and for displaying the change in temperature of each segment of the bushing comprising the steps of;

(a) compartmentalizing a glass fiber producing bushing into individual segments;

(b) flowing an electric current into a primary winding of a step down power transformer;

(c) connecting a secondary winding of the power transformer to the bushing such that the flow of current heats the bushing by electrical resistance means;

(d) sensing the electrical current flowing in the primary winding of the power transformer;

(e) converting the current sensed into a voltage signal ($E_m$) proportioned to the current flowing in the primary winding of the power transformer;

(f) simultaneously sensing a voltage ($E_i$) across each segment (i) of the bushing;

(g) storing the voltage signal ($E_m$) and simultaneously storing each voltage signal ($E_i$);

(h) sensing a new electrical current flowing in the primary winding of the power transformer;

(i) converting the new current sensed into a new voltage signal ($Em^1$) proportioned to the current flowing in the primary winding of the power transformer;

(j) simultaneously sensing a new voltage ($E_i^1$) across each segment (i) of the bushing;

(k) generating a scaling signal ($\alpha$);

(l) calculating with a microprocessor a change in temperature ($\Delta T_i$) based on the equation:

$$T_i = \frac{1}{\alpha} \left[ \frac{\frac{E_i^1}{E_m^1}}{\frac{E_i}{E_m}} - 1 \right];$$

(m) displaying the value $\Delta T_i$ to a display device; and (n) activating an alarm if the value of $\Delta T_i$ is outside a predetermined range.

* * * * *